United States Patent
Mrakovich et al.

(10) Patent No.: US 6,526,201 B1
(45) Date of Patent: Feb. 25, 2003

(54) LIGHT TRANSPORT COUPLER ASSEMBLY

(75) Inventors: Matthew S. Mrakovich, Streetsboro, OH (US); John V. DeNuto, Pasadena, MD (US)

(73) Assignee: Delphi Technologies, Inc., Troy, MI (US)

( * ) Notice: Subject to any disclaimer, the term of this patent is extended or adjusted under 35 U.S.C. 154(b) by 66 days.

(21) Appl. No.: 09/689,106

(22) Filed: Oct. 12, 2000

(51) Int. Cl.$^7$ .................................................. G02B 6/32

(52) U.S. Cl. ........................................................ 385/33

(58) Field of Search ...................................... 385/31, 33

(56) References Cited

U.S. PATENT DOCUMENTS 4,767,172 A  *  8/1988  Nichols et al. ................ 385/31
5,268,922 A  * 12/1993  Fouere et al. .................. 385/33
6,304,693 B1 * 10/2001  Buelow, II et al. ........... 385/31

* cited by examiner

Primary Examiner—Javaid Nasri
(74) Attorney, Agent, or Firm—Thomas N. Twomey

(57) ABSTRACT

A light emitting diode, LED, to fiber optic cable coupler assembly for use in data communications is disclosed. An integral aspheric lens comprises a base and a dome, both of which are circumvented by a reflective surface. The light rays emitted from the face are either directly incident upon a fiber optic cable face, or are refracted through the base and reflected upon the reflective surface. Once reflected, the rays become incident upon the fiber optic cable face.

20 Claims, 2 Drawing Sheets

LIGHT TRANSPORT COUPLER ASSEMBLY

TECHNICAL FIELD

This invention relates to a coupler assembly and more particularly to a light transport coupler assembly for data communications.

BACKGROUND OF THE INVENTION

Fiber optic cable data communication systems commonly require a coupler device which links optical data signals from a light emitting diode (LED) into a fiber optic cable. The fiber optic cable will then transmit the LED communication signals to external interfaces. The stronger the light signal within the fiber optic cable, the greater the potential for more interfaces and in-line connections with the cable (the more nodes within the system).

A LED consists of a metallic frame and a die secured to the frame. The die is actually a silicon chip. The metallic frame carries a current and produces a voltage differential across the silicon chip. As a result, the chip glows, emitting light. A clear material, commonly plastic, encases a portion of the metallic frame and the die, thereby protecting the die to frame connection. The outer surface of the plastic insulator over the die is formed into an aspheric lens. The asperic lens focuses some of the light emitted from the die onto an input face of the fiber optic cable. Only the incident rays within the acceptance angle of the fiber optic cable are transmitted. The remaining light emitted from the die is lost due to reflection within the insulator or refraction into air. The loss of this light hinders the strength of the fiber optic cable signal.

SUMMARY OF THE INVENTION

The invention provides a coupler assembly having an emitting light face, an aspheric lens, a reflective surface and an input face of a fiber optic cable, positioned along a centerline. The integral lens has a base located forward of the light source and a dome located forward of the base. The aspheric lens is further circumvented by the reflective surface.

The dome has an end surface and an apex separated by a first length along the centerline. The apex is located forward of the end surface. The base has a first end and a second end separated by a second length along the centerline. The second end is located forward of the first end. The emitting face is located at a distance less than the first length but greater than second length taken from the end surface extending rearward.

The reflective surface has an outer edge located forward of an inner edge. The reflective surface expands radially and elliptically outward from the inner edge to the outer edge. The inner edge is axially aligned to the first end of the base and the outer edge is axially aligned to the apex of the dome.

A feature of the invention is attributable to the base wherein the reflected rays of the prior art are refracted through the base. This refraction enhances the percentage of rays which become incident to the input face of the fiber optic cable thereby increasing signal strength.

Another feature of the invention is attributable to the reflective surface wherein the refracted rays from the base are reflected upon the surface. Once reflected the angle of the rays are such where the rays are incident to the input face. The input strength of the data communication signal is thereby increased further.

These and other objects, features and advantages of the invention will become more apparent from the following description of a preferred embodiment taken in conjunction with the accompanying drawing.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
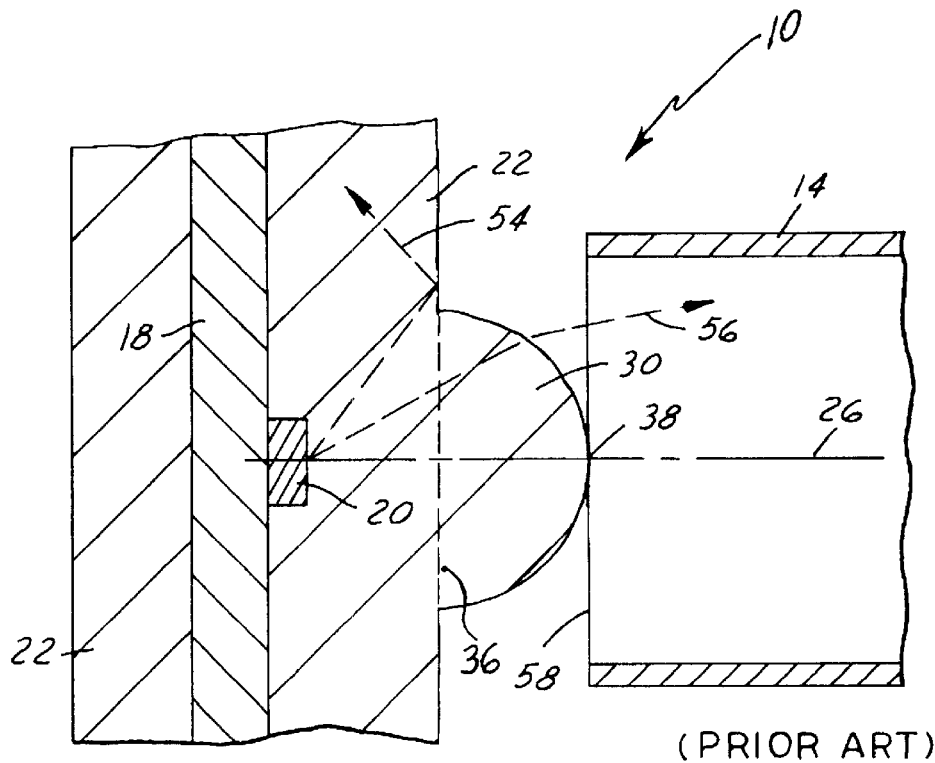
FIG. 1 is a longitudinal cross-sectional view of a prior art coupler assembly.
Figure 2:
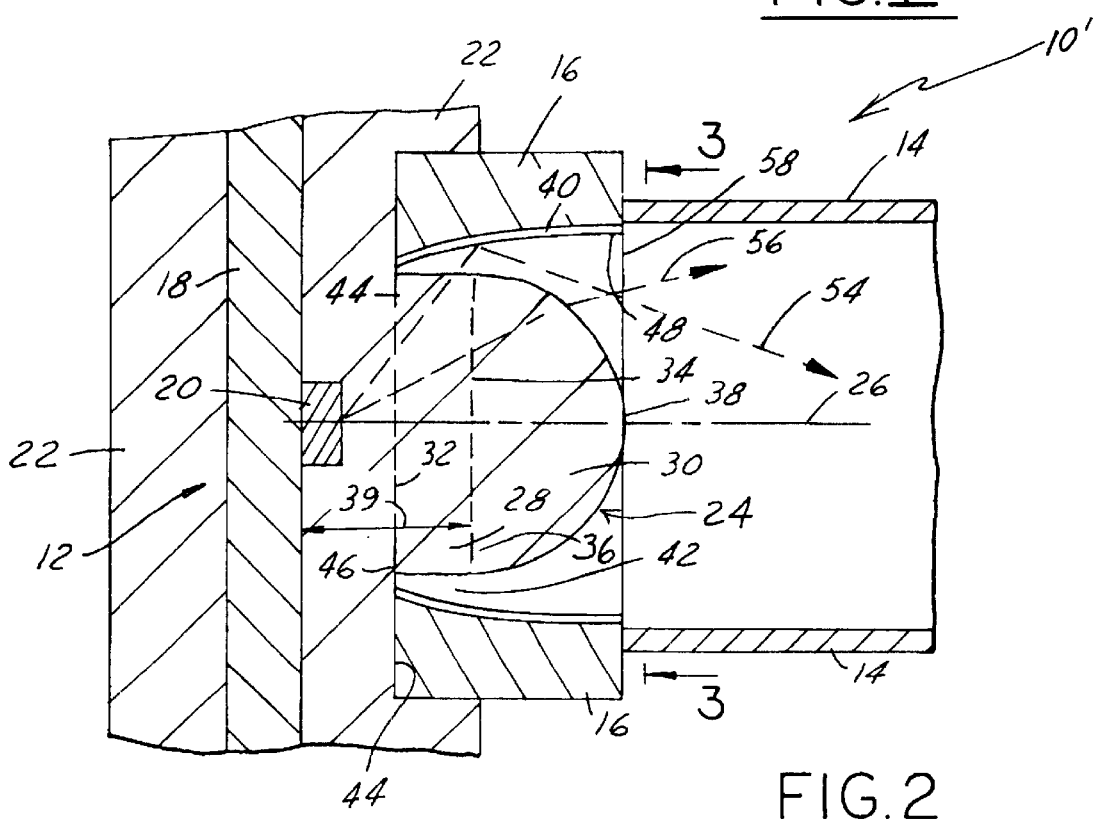
FIG. 2 is a longitudinal cross-sectional view of a coupler assembly of the present invention.

Referring to FIGS. 1 and 2, a prior art coupler assembly 10' and a coupler assembly 10 of the present invention are both utilized to transmit data communication signals from a light source 12 into a light transport 14. The light source 12 of the prior art and the current invention has a conductive member 18, a die 20, and an insulator 22. The conductive member 18 is generally perpendicular to the light transport 14. Light transport 14 is located forward of the die 20. Moreover, the light transport 14 has an input face 58 which opposes the die 20 along a centerline 26. Die 20 is in electrical contact with conductive member 18. Conductive member 18 carries an electrical current which produces a voltage differential across the die 20. When energized, the die 20 glows, emitting light. The conductive member 18 and the die 20 are surrounded and sealed from the outside environment by insulator 22. Insulator 22 protects the die 20 to conductor member 18 connection from oxidation and other external destructive elements.

Both the prior art coupler assembly 10' and the present invention coupler assembly 10 further have a dome 30. Dome 30 has an end surface 36 and an apex 38. The end surface 36 is located forward of the die 20 and is disposed perpendicularly about the centerline 26. End surface 36 is in integral contact with the insulator 22. The apex 38 is disposed on the centerline 26 forward of the end surface 36 and generally coplanar with input face 58. For reasons of efficiency comparison between the prior art and the present invention, the end surface 36 is assumed to be at a common distance 39 from the die 20. The dome 30 is integral to and commonly made of the same non-conductive material as the insulator 22. Insulator 22 must therefore have optical characteristics necessary to transmit light through the dome 30.

Figure 3:
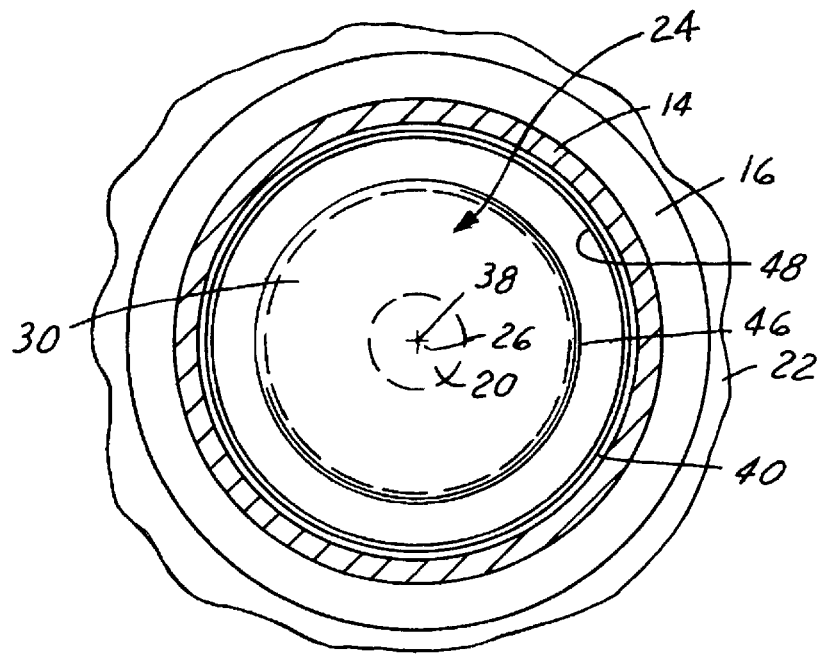
FIG. 3 is a cross-sectional view of the coupler assembly taken along line 3—3 of FIG. 2 viewing in the direction of the arrows.

Referring to FIGS. 2 and 3, the coupler assembly 10 of the present invention further has an aspheric lens 24 and a support member 16. Aspheric lens 24 has the dome 30 as in the prior art and a base 28 that differentiates the aspheric lens 24 from the prior art dome 30. For reasons of efficiency comparisons between the prior art and the present invention, the end surface 36 of the dome 30 is at a substantially equal distance 39 from the die 20. The base 28 may be formed by a groove 42 in the insulator 22 that receives the support member 16. The base 28 is located forward of the die 20 and rearward of the dome 30. Base 28 has a first end 32 and a second end 34. Second end 34 is located forward of the first end 32. End surface 36 is generally the same size as, and is connected congruently to, second end 34. The congruent connection will transmit light without refraction. Base 28, dome 30, and apex 38 are centered about the centerline 26. The insulator 22 the base 28 and the dome 30 are integral and generally made of the same clear material. This material can be plastic for ease of manufacturing and low cost.

The support member 16 is generally centered about centerline 26, radially outward of aspheric lens 24. Support member 16 generally extends axially from the first end 32 of base 28 to the apex 38 of dome 30. The support member 16 has a reflective surface 40 located about and generally in opposition to the aspheric lens 24. The reflective surface 40 has an inner edge 46 forward of the die 20 and an outer edge 48 forward of the inner edge 46. Reflective surface 40 extends and radially expands from inner edge 46 to outer edge 48. Outer edge 48 is generally co-located axially with apex 38, and generally co-planar with input face 58. Inner edge 46 may or may not be in contact with base 28, but is generally close to first end 32.

The reflective surface 40 can be polished aluminum if the support member 16 is made of aluminum. Likewise, the reflective surface 40 can be polished stainless steel if the support member 16 is made of stainless steel, and so on. Moreover, the reflective surface 40 can be a metalic plating, such as chrome, if the support member 16 material chosen is compatible for the plating process.

Insulator 22 has a groove 42 containing a bottom surface 44. Groove 42 is generally centered about the centerline 26. Bottom surface 44 is generally coplanar with the first end 32 of the base 28 of aspheric lens 24. The support member 16 is positioned and secured within the groove 42.

The light source 12 is preferably a light emitting diode, LED, and the light transport 14 is preferably a fiber optic cable. The die 20 is preferably a piece of silicon and the conductive member 18 is preferably a metallic frame. The aspheric lens 24 is preferably generally circular and concentric about the centerline 26. The dome 30 is preferably generally a hemisphere. And the reflective surface 40 radially expands elliptically from the inner edge 46 to the outer edge 48.

Referring to the prior art of FIG. 1, an LED is known to use dome 30 as an integral part of the LED body, but without the base 28 found in the present invention. Without base 28, peripheral rays 54 reflect internally in the LED body per Snell's Law. These internally reflected rays are not transmitted into the light transport 14 but are lost, thus signal strength is lost. For instance in one known prior art coupler, incident rays 56 which were transmitted amount to only about 42% of the total emitted light.

Referring to FIG. 2, the base 28 has been added in accordance to the present invention. Since the distance 39 remains constant between the prior art and the present invention, adding base 28 effectively brings a radial surface closer to the die 20. The peripheral rays 54 are no longer reflected internally off of a planar insulator 22 surface, as in the prior art, but are now refracted through a perpendicular radial surface of the base 28. Depending on the size of the input face 58, the refracted peripheral rays 54 may or may not be incident to the light transport 14. However, some of the refracted peripheral rays 54 are captured thereby providing a slight improvement in coupler efficiency over the prior art.

Adding the reflective surface 40 about the base 28 provides yet a further improvement in coupler efficiency. Here, all of the base 28 refracted peripheral rays 54 not incident upon the input face 58, are reflected upon reflective surface 40. The reflected rays 54 are now incident upon input face 58. Whereas the coupling efficiency of the prior art coupler discussed above was 42%, the efficiency of a coupler of the invention with the base 28 and the reflective surface 40, utilizing the same size input face 58 and dome 30 as the prior art, is about 70%.

Figure 4:
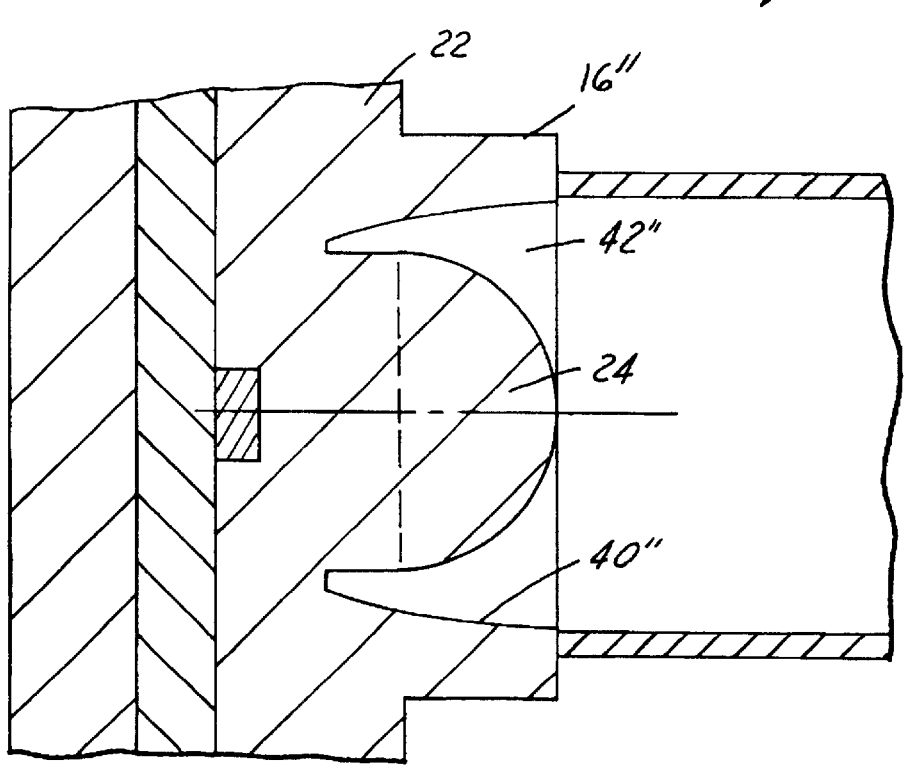
FIG. 4 is a longitudinal cross-sectional view of a second embodiment of the coupler assembly.

Referring to FIG. 4, the coupler assembly 10" is a second embodiment of the present invention. Like the integral aspheric lens 24, the support member 16" may also be integral to the insulator 22. With this embodiment, the groove 42" is reduced in size and reshaped to provide the proper spatial relationship between the reflective surface 40" and the aspheric lens 24. The reflective surface 40" must then be a separate part, such as a metallic plating, that is adhered to what is now the integral support member 16".

Although the preferred embodiments of the present invention have been disclosed, various changes and modifications may be made thereto by one skilled in the art without departing from the scope and spirit of the invention as set forth in the appended claims.

We claim:

1. A coupler assembly for transmitting data communication signals from a light source into a light transport comprising:

a die of the light source, the die having a centerline;

an aspheric lens having a base and a dome, the base having a first end and a second end, the base disposed about the centerline, the second end located forward of the first end and forward of the die, the dome having an end surface, an apex, and a length, the dome located forward of the base, the apex located forward of the end surface, the end surface congruently connected to the second end, the apex located on the centerline, the length extending axially along the centerline from the end surface to the apex;

a support member having a reflector surface located about and opposing the aspheric lens, the reflector surface having an inner edge and an outer edge, the inner edge located coaxially with or forward of the first end of the base and the outer edge located forward of the inner edge, the surface extending and radially expanding from the inner edge to the outer edge; and a light transport having an input face, the input face disposed about the centerline and forward of the apex.

2. A coupler assembly as set forth in claim 1 wherein the light source is a light emitting diode.

3. A coupler assembly as set forth in claim 1 wherein the light transport is a fiber optic cable.

4. A coupler assembly as set forth in claim 1 wherein the base, the dome, the reflector surface, and the input face are circular and concentric about the centerline, and the second end is the same size as the end surface.

5. A coupler assembly as set forth in claim 4 wherein the input face radially extends beyond the outer edge.

6. A coupler assembly as set forth in claim 4 wherein the dome is a hemisphere, the base is a cylinder, and the end surface and the second end are the same size.

7. A coupler assembly as set forth in claim 1 or claim 4 wherein the reflector surface expands elliptically.

8. A coupler assembly as set forth in claim 7 wherein the first end of the base is forward of the die, and the inner edge of the reflector surface contacts the first end.

9. A coupler assembly as set forth in claim 8 wherein the outer edge of the reflector is axially aligned to the apex of the dome.

10. A coupler assembly for transmitting data communication signals from a light source into a light port comprising:

a die of the light source, the die having a centerline;

a dome having an end surface, and an apex, The end surface located forward of the die, the apex located forward of the end surface along The centerline;

a reflector surface located about and opposing the dome, the reflector surface having an inner edge forward of the die and an outer edge forward of the inner edge, the surface extending and radially expanding from the inner edge to the outer edge; and a light transport having an input face, the input face dosed about the centerline and forward of the apex, the input face radially extending outwardly beyond the outer edge.

11. A coupler assembly as set forth in claim 10 further comprising:

a base having a planar first end and a second end, the base located forward of the die and disposed about the centerline, the second end located forward of the first end, the base and dome forming an aspheric lens, the reflector surface circumventing the aspheric lens.

12. A coupler assembly as set forth in claim 11 wherein the base is a cylinder, the dome is a hemisphere, the reflector surface is radially circular and axially expands elliptically, and the input face is circular.

13. A coupler assembly as set forth in claim 10 wherein the light source is a light emitting diode.

14. A coupler assembly as set forth in claim 10 wherein the light transport is a fiber optic cable.

15. A coupler assembly for transmitting data communication signals from a light source into a light transport comprising:

a conductive member;

a die secured to the conductive member, the die having a centerline;

an insulator surrounding the conductive member and the die, the insulator having a groove, The groove having a bottom surface, the groove and the bottom surface centered about the center line, the bottom surface disposed forward of the die;

an aspheric lens having a first end and an apex, the apex disposed forward of the first end, the apex positioned to lie on the center line, the first end secured to the bottom surface, the aspheric lens centered about the centerline;

a light transport having an input face, the input face disposed about the centerline and forward of the apex; and wherein the groove is defined by the insulator and is disposed radially outward from the aspheric lens and the bottom surface extends radially outward from the aspheric lens.

16. A coupler assembly as set forth in claim 15 further comprising a support member having a reflector surface, the support member disposed within the groove, the reflector surface positioned to oppose and circumvent the aspheric lens, the reflector surface having an inner edge forward of the die and an outer edge forward of the inner edge, the reflector surface extending and radially expanding from the inner edge to the outer edge.

17. A coupler assembly as set forth in claim 16 wherein the base is a cylinder, the dome is a hemisphere, the reflector surface is radially circular, and the input face is circular.

18. A coupler assembly as set forth in claim 16 wherein the reflector surface axially expands elliptically.

19. A coupler assembly as set forth in claim 15 wherein the light source is a light emitting diode.

20. A coupler assembly as set forth in claim 15 wherein the light transport is a fiber optic cable.

* * * * *